United States Patent [19]
Sundara

[11] Patent Number: 6,080,440
[45] Date of Patent: Jun. 27, 2000

[54] PROCESS FOR DECREASING THE DISCOLORATION OF VEGETABLES

[75] Inventor: Venkata-Ramana Sundara, Lausanne, Switzerland

[73] Assignee: Nestec, S.A., Vevey, Switzerland

[21] Appl. No.: 09/329,231

[22] Filed: Jun. 10, 1999

[30] Foreign Application Priority Data

Jun. 13, 1998 [EP] European Pat. Off. .............. 98110852

[51] Int. Cl.⁷ ....................................... A23B 7/00
[52] U.S. Cl. .......................... 426/524; 426/312; 426/486; 426/506
[58] Field of Search .................................. 426/506, 507, 426/486, 312, 524

[56] References Cited

U.S. PATENT DOCUMENTS

| | | |
|---|---|---|
| 1,668,903 | 5/1928 | Haslacher . |
| 2,666,711 | 1/1954 | Crosset ..................................... 426/506 |
| 3,352,687 | 11/1967 | Rockland et al. . |
| 3,476,078 | 11/1969 | King . |
| 3,843,810 | 10/1974 | Fehmerling .............................. 426/204 |

FOREIGN PATENT DOCUMENTS

| | | |
|---|---|---|
| 476809 | 10/1947 | Belgium . |
| 727145 | 1/1969 | Belgium . |
| 961400 | 5/1950 | France . |
| 2396516 | 2/1979 | France . |
| 2726739 | 5/1996 | France . |
| 9002367 | 3/1991 | Netherlands . |
| 936194 | 9/1963 | United Kingdom . |

*Primary Examiner*—George C. Yeung
*Attorney, Agent, or Firm*—Pennie & Edmonds LLP

[57] ABSTRACT

The present invention is directed to a process which includes the steps of forming a mixture by submerging a vegetative food product in an amount of water sufficient to cover the food product; degassing the mixture for a time and amount of pressure sufficient to remove gases from tissues of the vegetative food product and fill intercellular spaces of tissues with water; flushing the degassed mixture with an inert gas for a time sufficient to reestablish a pressure that is substantially atmospheric; draining water from the mixture to obtain the vegetative food product; and freezing the resultant vegetative food product for storage until use, wherein discoloration of the vegetative food product is decreased compared to vegetative food products that are not treated by this process. This process minimizes the availability of oxygen in tissue of the vegetative food product while protecting the color and texture of the product by avoiding mechanical or thermal stresses on the product.

10 Claims, No Drawings

PROCESS FOR DECREASING THE DISCOLORATION OF VEGETABLES

BACKGROUND OF THE INVENTION

The present invention is directed to a process for decreasing the discoloration of vegetables.

British patent No. 936,194 discloses a process for treating a liquid-containing food product, particularly spinach. The process includes steps for blanching the product by heating, pulping the product by mechanical, and introducing the liquefied product into an enclosed vessel. A sub-atmospheric pressure is maintained within the enclosed vessel such that the gas contained in the liquefied product is removed. Thereafter, the liquefied product is treated to deep freeze conditions. This process is problematical because when the food product is thawed, the food product has a poor taste quality and does not posses a fresh look which is of importance to consumers. The problem arises because when the product is treated to mechanical pulping or freezing/thawing an enzymatic browning occurs creating polyphenols, polyphenol oxidases, and oxygen. Thus, heat treatment, i e., blanching, is carried out to inactivate the enzymes, but such treatment alters the color and texture of the liquefied product.

As discussed above, food products that undergo either mechanical stress, thermal stress, or both lose there natural appearance and texture. Further development into efficient and cost effective processes that improve or maintain a food product's appearance and texture after processing are still needed. Consumers increased demand for food products with a fresh appearance and texture has created a need for better food processes.

SUMMARY OF THE INVENTION

The present invention is directed to a process for decreasing the coloration of a vegetative food product such as vegetables. Vegetables include food products such as basil, spinach, beans, broccoli, herbs, or mixtures thereof, preferably in their raw form. The process comprises the steps of forming a mixture by submerging a vegetative food product in an amount of water sufficient to cover the food product; degassing the mixture for a time and amount of pressure sufficient to remove gases from tissues of the vegetative food product and fill intercellular spaces of tissues with water; flushing the degassed mixture with an inert gas for a time sufficient to reestablish a pressure that is substantially atmospheric; draining water from the mixture to obtain the vegetative food product; and freezing the resultant vegetative food product for storage until use, wherein discoloration of the vegetative food product is decreased compared to vegetative food products that are not treated by this process.

The water used in the present invention is preferably at about room temperature and in an amount sufficient to cover and submerge the vegetative food product. After forming the mixture, the mixture is degassed for a sufficient amount of time and under a sufficient pressure to remove the gases from the tissues of the vegetative food product and fill intercellular spaces with water. The degassing step can take as long as between about two to ten minutes, and is preferably four to six minutes. The degassing step can be carried out using a mild vacuum at a pressure between about 300 mbar to about 400 mbar. Subsequently, the mixture is flushed with an inert gas to establish about atmospheric pressure using an inert gas of nitrogen, argon, helium, krypton, or mixtures thereof. Finally, the mixture is drained of water, and frozen. Optionally, after the freezing step, the process may include a packaging step wherein the frozen food product is placed into aluminum or plastic bags. The freezing step may be conducted at a temperature of between about $-15°$ C. to about $-20°$ C.

DETAILED DESCRIPTION OF THE INVENTION

The present invention resolves the need for food processes which provide a fresher appearance and better texture through minimizing oxygen availability within the tissue of vegetables or other vegetative food products. Furthermore, the color and texture of these products are protected from degradation and any mechanical or thermal stress is avoided until further use of the products.

The present invention provides several benefits to the treatment of vegetative food products. One benefit is to provide a fresh appearing product after the product has been processed and packaged. Another benefit is to minimize any taste quality loss during processing of the food. Yet another advantage of the present invention is to provide a process that is cost efficient and easily implemented.

The present invention is directed to a process which comprises the steps of forming a mixture by submerging a vegetative food product in water, degassing the mixture, flushing the mixture with an inert gas, draining the mixture of water, and freezing the food product.

As used herein, the term "vegetative food product" includes edible materials grown in the ground, trees, shrubs, bushes, using hydroponic methods, or any other method known by one of ordinary skill in the art. Preferred vegetative food products includes herbs, fruits, vegetables, or mixtures thereof preferably in their raw form. These products can be either whole or cut. Herbs include rosemary, sage, parsley, basil, and any other herb used in the preparation of foods, including the preparation of sauces, such as pesto sauce. Vegetables preferably include green vegetables, i.e., those vegetables which contain chlorophyll, including but not limited to spinach, beans, broccoli, and equivalents thereof. The process is used to maintain chlorophyll and original color of the product.

As used herein, the term "inert gas" includes any gas that is chemically unreactive under the process conditions. Inert gas includes, but is not limited to, nitrogen, argon, helium, krypton, and mixtures thereof.

The step of forming a mixture of vegetative food product and water comprises placing the product in a suitable container and adding water thereto in an amount sufficient to completely cover and submerge the product. Preferably, the water is at room temperature.

The degassing step comprises degassing the water and vegetative food product mixture using an inert gas. The degassing step should be conducted for a sufficient amount of time and at a sufficient pressure to remove gases from the tissues of the vegetative food product while simultaneously filling intercellular spaces in the tissues with water. Preferably, the amount of time for degassing should be between about 2 minutes and about 10 minutes, and more preferably, between about 4 minutes and 6 minutes. The level of degassing comprises a mild vacuum, preferably between about 300 mbar and about 400 mbar (atmospheric pressure is 942 mbar). The degassing step is carried out using any vacuum pump that can achieve the necessary pressure; preferably, the device used for degassing is a classical vacuum pump.

The step of flushing the system with an inert gas comprises introducing an inert gas into the chamber in a sufficient amount to reestablish atmospheric pressure. The flushing step includes introducing nitrogen into the chamber at as sufficient rate to reestablish atmospheric pressure.

The step of draining the mixture of water comprises removing the excess water from the chamber. The water removal can be conducted using any method as known in the art, preferably, the method used to remove water includes by gravity treatment.

The food products are frozen using methods commonly known in the art. One of ordinary skill in the art step with little or no experimentation can easily determine the conditions necessary to freeze any food product. Preferably, the food product is frozen at a temperature of between about −15° C. to about −20° C. Optionally the frozen food products can be subsequently packaged into suitable containers, preferably, plastic or aluminum bags.

EXAMPLES

The invention will now be illustrated by the following examples. The examples are not intended to be limiting of the scope of the present invention. In conjunction with the general and detailed descriptions above, the examples provide further understanding of the present invention.

Examples for processing specific food products in accordance with the invention are provided below. While the following examples illustrate preparations with one or more food products, one of ordinary skill will understand that these processes may also be carried out with any of a variety of other food products using methods well known and understood by those of ordinary skill.

Example 1

The green pieces of basil leaves were immersed in water and kept immersed with the aid of the perforated weight in a desiccator. During this time the inlet valve of the desiccator was kept in the closed position. Using a vacuum pump, the pressure inside the desiccator was reduced to a sufficient amount to remove the intercellular gases from plant tissue. Gas bubbles were observed in the water. The green pieces of basil leaves were left inside the desiccator for about four minutes at a pressure of about 400 mbar. After about four minutes, the pressure within the desiccator was restore to atmospheric pressure by gently allowing nitrogen gas into the desiccator through the inlet valve. The green pieces were removed from the desiccator, drained to remove the surface water, packed in aluminum foil/polyethylene laminate bags, and stored at about −18° C.

Example 2

The green pieces of broccoli were immersed in water and kept immersed with the aid of the perforated weight in a desiccator. During this time the inlet valve of the desiccator was kept in the closed position. Using a vacuum pump, the pressure inside the desiccator was reduced to a sufficient amount to remove the intercellular gases from plant tissue. Gas bubbles were observed in the water. The green pieces of broccoli were left inside the desiccator for about six minutes at a pressure of about 300 mbar. After about six minutes, the pressure within the desiccator was restore to atmospheric pressure by gently allowing nitrogen gas into the desiccator through the inlet valve. The green pieces of broccoli were removed from the desiccator, drained to remove the surface water, packed in aluminum foil/polyethylene laminate bags, and stored at about −18° C.

Example 3

The green pieces of green beans were immersed in water and kept immersed with the aid of the perforated weight in a desiccator. During this time the inlet valve of the desiccator was kept in the closed position. Using a vacuum pump, the pressure inside the desiccator was reduced to a sufficient amount to remove the intercellular gases from plant tissue. Gas bubbles were observed in the water. The green pieces of green beans were left inside the desiccator for about six minutes at a pressure of about 300 mbar. After about six minutes, the pressure within the desiccator was restore to atmospheric pressure by gently allowing nitrogen gas into the desiccator through the inlet valve. The green pieces of green beans were removed from the desiccator, drained to remove the surface water, packed in aluminum foil/polyethylene laminate bags, and stored at about −18° C.

Example 4

Fresh basil leaves were blanched in boiling water for about 2 minutes to inactivate enzymes. Untreated and blanched samples of fresh basil leaves were individually packed in aluminum foil/polyethylene laminate bags and stored at about −18° C.

Example 5

Fresh broccoli pieces were blanched in boiling water for about 2 minutes to inactivate enzymes. Untreated and blanched samples of broccoli pieces were individually packed in aluminum foil/polyethylene laminate bags and stored at about −18° C.

Example 6

Fresh green beans were blanched in boiling water for about 2 minutes to inactivate enzymes. Untreated and blanched samples of green beans were individually packed in aluminum foil/polyethylene laminate bags and stored at about −18° C.

Comparative Example 7

Two main analysis were made using the sample prepared from examples 1–6. The first analysis is a pigment analysis and the second was a texture analysis.

Samples for the pigment analysis were prepared by allowing frozen basil, frozen green beans, and frozen broccoli to thaw overnight at about 4° C. Thereafter, the samples were ground using an Ultra Turrax grinder. Each sample was prepared by mixing two grams of food sample and about 9 ml of acetone in a centrifuge tube, placing the tube in a centrifuge, transferring the supernatant liquid to a 20 ml flask, and filtering the solution in preparation for HPLC analysis. Using an HPLC Kontron system, the samples were analyzed for chlorophyll and it degradation products content.

The samples containing food products that were blanched, contained pheophytin a and b, both of which are degradation products of chlorophyll. When the food samples containing basil, green beans, or broccoli were subjected to the process of the present invention before freezing, the amount of chlorophyll degradation products was less than the samples containing blanched food products.

Samples of the texture analysis were analyzed using a Texture Analyzer TA-XT2 (Haslemere, Surrey, England). Pieces of green beans and broccoli 8 mm thick were placed in a cylinder. Thereafter, the samples were analyzed to determine the F value corresponding to 25% strain in the samples, as calculated from force deformation curves. The results were as shown in Table 1.

| F (Kg) | Beans | Broccoli |
| --- | --- | --- |
| Untreated | 21 | 9.4 |
| Blanched | 8 | 6.1 |
| Present Invention | 19.5 | 9.3 |

A comparison of the values of Table 1, demonstrate the firmness of the vegetables obtained according to the present invention are very near the firmness of the fresh, untreated vegetables. The blanched or heat treated vegetables, however, demonstrated a substantial decrease in tissue firmness.

What is claimed is:

1. A process for decreasing discoloration of a vegetative food product comprising the steps of:

forming a mixture by submerging a vegetative food product in an amount of water sufficient to cover the food product;

degassing the mixture for a time and amount of pressure sufficient to remove gases from tissues of the vegetative food product and fill intercellular spaces of tissues with water;

flushing the degassed mixture with an inert gas for a time sufficient to reestablish a pressure that is substantially atmospheric;

draining water from the mixture to obtain the vegetative food product; and freezing the resultant vegetative food product for storage until use, wherein discoloration of the vegetative food product is decreased compared to vegetative food products that are not treated by this process.

2. The process according to claim 1, wherein the water has a temperature that is approximately at room temperature.

3. The process according to claim 1, wherein the degassing step is conducted for between about 2 minutes to about 10 minutes.

4. The process according to claim 3, wherein the degassing step is conducted for between about 4 minutes to about 6 minutes.

5. The process according to claim 1, wherein the degassing step is performed using a mild vacuum comprising a pressure of between about 300 mbar to about 400 mbar.

6. The process according to claim 1, wherein the inert gas is nitrogen, argon, helium, krypton, or a mixture thereof.

7. The process according to claim 1, wherein the freezing step is conducted by cooling the vegetative food product to a temperature of between about $-15°$ C. to about $-20°$ C.

8. The process according to claim 1, wherein the vegetative food product is basil, spinach, beans, broccoli, herbs, and mixtures thereof.

9. The process according to claim 1, wherein the vegetative food product is a raw food product.

10. The process according to claim 1, which further comprises packaging the vegetative food product after the freezing step.

* * * * *